United States Patent [19]

Mauceri

[11] 4,067,806

[45] * Jan. 10, 1978

[54] FORMULATION AND APPLICATION OF COMPOSITIONS FOR THE DETACKIFICATION OF PAINT SPRAY BOOTH WASTES

[75] Inventor: Frank A. Mauceri, Clarendon Hills, Ill.

[73] Assignee: Nalco Chemical Company, Oak Brook, Ill.

[*] Notice: The portion of the term of this patent subsequent to May 31, 1994, has been disclaimed.

[21] Appl. No.: 723,864

[22] Filed: Sept. 16, 1976

[51] Int. Cl.$^2$ .............................................. C02B 1/20
[52] U.S. Cl. ............................................ 210/52; 55/85; 55/89; 134/38; 210/54; 252/181; 260/29.6 TA; 260/29.6 HN
[58] Field of Search ............................... 55/19, 84–89; 134/38; 210/51–54; 252/180, 181; 260/29.6 TA, 29.6 HN

[56] References Cited

U.S. PATENT DOCUMENTS

| | | | |
|---|---|---|---|
| 3,147,218 | 9/1964 | Booth et al. | 210/54 |
| 3,515,575 | 6/1970 | Arnold | 210/54 |
| 3,803,104 | 4/1974 | Barabas et al. | 260/29.6 TA |
| 3,861,887 | 1/1975 | Forney | 55/19 |
| 3,907,927 | 9/1975 | Guilbault | 210/54 |
| 3,990,869 | 11/1976 | Forney | 55/19 |
| 3,990,986 | 11/1976 | Gabel et al. | 252/181 |
| 4,002,490 | 1/1977 | Michalski et al. | 55/84 |
| 4,026,794 | 5/1977 | Mauceri | 210/43 |

*Primary Examiner*—Charles N. Hart
*Assistant Examiner*—Peter A. Hruskoci
*Attorney, Agent, or Firm*—John G. Premo; Robert A. Miller; Barry W. Sufrin

[57] ABSTRACT

Water used to wash the air in paint or lacquer spray booths in order to remove over-sprayed paint or lacquer is treated with a blend of a terpolymer containing 5–40% by weight of diallyl dimethyl ammonium halide, 5–75% by weight of N-vinyl-2-pyrrolidone, 10–60% by weight of acrylamide, and a water-soluble salt of an amphoteric metal to reduce the tackiness of paint and lacquer solids and thereby reduce the tendency of over-sprayed paints and lacquers to adhere to walls, ceilings and floors of said spray booths and also to condition the paint and lacquer solids removed with the water so that they can be separated and the water recycled for further use in washing the air in the spray booth.

6 Claims, No Drawings

FORMULATION AND APPLICATION OF COMPOSITIONS FOR THE DETACKIFICATION OF PAINT SPRAY BOOTH WASTES

This invention involves a method for the clarification and detackification of paint spray booth wastes. In the application of paints and lacquers to automobile bodies and other types of articles it is customary to carry out such operations in enclosed spray booths and to introduce into such spray booths a curtain of water to wash the air and to remove over-sprayed paints or lacquer solids. The water containing suspended solids is filtered or otherwise treated to separate the solids so that the water can be recycled.

This process involves many problems. Thus, the paint and lacquer solids are normally tacky and tend to adhere to the walls, ceilings and floors of the spray booths which makes it necessary to shut down the operation from time to time in order to clean the spray booths. The deposits which are formed on the walls, ceilings and floors of the spray booths are also subject to the growth of anaerobic corrosive bacteria (e.g., desulfovibrio) which generates corrosive and highly objectionable hydrogen sulfide.

The paint and lacquer solids which are washed away and form suspensions in the water that is removed from the spray booths present a disposal problem. In order to avoid contamination of the environment it is customary to separate these solids from the water and to recirculate the water but these solids are difficult to separate by the usual method of filtration.

It is therefore desirable to control pollution and contamination in paint or lacquer spray booths so as to prevent, as much as possible, the deposition of paint and lacquer solids on walls, ceilings and floors and to condition the sludge which is removed with the water so that it can be readily filtered and the water which forms the filtrate can be returned for use in the process.

Many processes have been tried in efforts to remove this waste paint. One, merely lets the paint fall into the water, where it settles by gravity over a period of time from where it is eventually removed by dredging the sticky mass from the floor of the vessel in which it is contained. This method has proved most unsatisfactory and as a result chemical treatments have been developed which will facilitate the cleaning of paint spray booth wastes from the water and which will furthermore provide a usable material for recycle, eliminating the tremendous waste of paint by overspray.

One of the chemical treatments which has proven most effective for the clarification and detackification of paint spray booth wastes involves the addition of a water-soluble metallic salt, usually zinc chloride along with a polyelectrolyte which acts as a suspending agent such as that found in U.S. Pat. No. 3,861,887 herein incorporated by reference. Upon the addition of this material to the aqueous paint spray booth wastes and subsequent modification of the waste water to a pH above about 8, zinc hydroxide, a gellatinous material precipitates and coats the paint particles in suspension settling them and causing them to become detackified. This allows rapid cleanup of this settled material by skimmers, filters and the like. This zinc hydroxide coated paint may then be recovered by treatment with water at an acidic pH followed by dissolution in a solvent so as to recover the organic based paint.

While these types of processes have performed adequately in the past, they are not applicable to all paint wastes, and an improvement upon these compositions would be beneficial to the art.

I have discovered that by using a water-soluble cationic terpolymer containing from 5–40% by weight of diallyl dimethyl ammonium chloride, 5–75% by weight of N-vinyl-2-pyrrolidone and 10–60% acrylamide having a molecular weight of 5,000 to 300,000 in conjunction with the water-soluble salt of an amphoteric metal, surprising and superior paint clarification and detackification takes place. It is pointed out that unlike Forney U.S. Pat. No. 3,861,887 the polymer used in this invention is not a polyamine formed by condensation polymerization but is instead what could be termed a cationic vinyl addition polymer.

OBJECTS

An object of this invention is to provide to the art a new and useful composition for the clarification and detackification of paint spray booth wastes.

A further object of this invention is to provide to the art a composition for the clarification and detackification of spray booth wastes which comprises:

1. 15–50% by weight of a water-soluble salt of an amphoteric metal;
2. 1.0–15% by weight of a water-soluble cationic terpolymer containing prior to polymerization:
   a. 5–40% by weight of diallyl dimethyl ammonium chloride;
   b. 5–75% by weight of N-vinyl-2-pyrrolidone;
   c. 10–60% acrylamide, said terpolymer having a molecular weight of from 5,000 to 300,000;
3. 35–85% water.

Another one of the objects of the present invention is to provide a new and improved process for controlling pollution and contamination in paint or lacquer spray booths in which the water used to wash the air in the spray booth and to remove over-sprayed paints or lacquers is conditioned by one or more additives which reduce the tackiness of paint and lacquer solids and thereby reduce the tendency of such solids to adhere to walls, ceilings and floors of paint and lacquer spray booths making it possible to operate such booths over a longer period of time before cleaning them which also reduces maintenance costs.

Another object of the invention is to provide a process of the type described in which paint and lacquer solids suspended in the water which is used to wash the air in spray booths are so conditioned that they can be recovered by filtration and the filtrate recycled in the process.

Another object of this invention is to provide a process of the type described characterized by deposit corrosion control, longer booth runs, less maintenance, a more consistent effluent, lower plant treatment costs, lower microbiological activity, and the production of a sludge from the paint and lacquer solids which is more readily dewatered by filtration or otherwise than has been the case in conventional commercial operation.

Other objects will appear hereinafter.

DESCRIPTION OF THE INVENTION

The conventional paint or lacquer spray booth is a closed room where the object to be painted or lacquered is sprayed with paint or lacquer and the air is washed with a curtain or spray of water so as to remove over-sprayed paints or lacquers in the form of suspensions of paint or lacquer solids. These suspensions can be disposed of as waste materials but in order to avoid contamination of the environment, it is desirable to separate the solids and to reuse the water. Unfortunately, the paint or lacquer solids are quite tacky and despite air washing with water, they tend to build up in the form of deposits on the walls, ceilings and floors of the spray booths. In a typical operation a run might last for two weeks and at the end of that time the spray booth has to be emptied and cleaned. The cleaning might require two hundred man hours. Furthermore, the sludge which is produced during the operation of the spray booth as a result of the combination of the water with the paint or lacquer solids is usually very difficult to de-water by the customary filtration methods. In addition, the accumulation of the paint or lacquer deposits on the walls, ceilings and floors of the spray booths provides a suitable environment for anaerobic corrosive bacteria.

In the practice of the present invention, it has been found that the addition of a blend containing:
1. 15-50% by weight of a water-soluble salt of an amphoteric metal;
2. 1.0-15% by weight of a water-soluble cationic terpolymer containing prior to polymerization:
   a. 5-40% by weight of diallyl dimethyl ammonium chloride;
   b. 5-75% by weight N-vinyl-2-pyrrolidone;
   c. 10-60% acrylamide, said terpolymer having a molecular weight of from 5,000 to 300,000; and
3. 35-85% water to the water used in washing the air, and in catching overspray in the spray booth, reduces the tackiness of paint and lacquer solids. This reduces the tendency of oversprayed paint and lacquer to adhere to the walls, ceilings, and floors of the spray booth and at the same time conditions the detackified paint solids so that they can be readily removed from the waste water after the suspension of solids has been removed from the spray booth. The separation of solids from the water can be effected by vacuum filtration or any other suitable manner allowing the reuse of the filtrate in the process.

THE INVENTION

The compositions which we prefer to use in this invention for the clarification and detackification of paint spray booth wastes comprises:
1. 15-50% by weight of a water-soluble salt of an amphoteric metal;
2. 1.0-15% by weight of a water-soluble cationic terpolymer containing prior to polymerization:
   a. 5-40% by weight of diallyl dimethyl ammonium chloride;
   b. 5-75% by weight N-vinyl-pyrrolidone;
   c. 10-60% acrylamide; said polymer having a molecular weight range of from 5,000 to 300,000; and
3. From 35-85% by weight water.

THE WATER-SOLUBLE METALLIC SALTS

The water-soluble metallic salts which are useful in the scope of this invention encompass all water-soluble inorganic salts which will form floc-like hydroxide compounds at pH values greater than 7. While we prefer to use magnesium chloride in the scope of this invention due to its high water solubility and the fact that the chlorine ion presents no pollution problem, other magnesium salts can be used including magnesium sulfate and magnesium nitrate. Additionally, aluminum chloride, aluminum sulfate, ferric chloride, ferric sulfate, zinc chloride, zinc sulfate and zinc nitrate all give satisfactory results when used with this invention. It is understood that the above list does not encompass all metallic salts that will work in our invention and that other metal salts work in our invention and that other metal salts would be expected to prove satisfactory providing the particular cation will form an insoluble hydroxide at pH's greater than about 7 and that the anion in the salt will not cause pollution problems.

THE TERPOLYMER

The terpolymer of the instant invention is prepared by polymerizing together 5-40% by weight of diallyl dimethyl ammonium chloride, 5-75% by weight of N-vinyl-2-pyrrolidone and 10-60% acrylamide. Well known solution polymer techniques are employed with the resultant polymer generally having a molecular weight of from 5,000 to 300,000 and preferably from 100,000 to 200,000. Due to the viscosity of the resultant solution polymer, it is generally handled as a dilute solution although it may be polymerized in a more concentrated form and then diluted to the desired level for inclusion in the composition of the instant invention.

In the preferred practice of this invention, the terpolymer employed will contain from 15-35% diallyl dimethyl ammonium chloride, 30-50% N-vinyl-2-pyrrolidone and 20-50% acrylamide. Most preferably, a polymer composition containing approximately 25% diallyl dimethyl ammonium chloride, 40% N-vinyl-2-pyrrolidone, and 35% acrylamide is preferred.

The terpolymer of the instant invention is generally polymerized using solution polymer techniques with water as the solvent. The monomer concentration will generally range from 5-40% by weight and most preferably from 10-30% by weight. Conventionally, free radical catalyst are employed, such as: peroxides; red-ox systems, especially sulfite-persulfate; and organic free radical initiators, such as azobisisobutyronitrile. The catalyst is generally added to the reaction vessel as a dilute solution in either water or a water-soluble hydrocarbon liquid. The terpolymer of the instant invention may be prepared using conventional equipment for polymerization of this nature.

The polymerization itself is generally conducted at neutral pH values and at temperatures of from 25°-90° C. Molecular weight obtained on the above terpolymer are generally low to moderate ranging from several thousands to 300,000.

FORMULATION OF THE COMPOSITION

The composition of this invention is prepared by simply blending together a 5-40% by weight aqueous solution of the terpolymer with an aqueous solution of the water-soluble salt of the amphoteric metal employed. Generally, the composition should be formulated so that it contains 15-50% by weight of a water-soluble salt of an amphoteric metal, and 1.0-15% by weight of the water-soluble cationic terpolymer described above. Preferably, the composition will contain 20-40% by weight of the water-soluble salt of an amphoteric metal and 1.0-10% by weight of the water-soluble cationic terpolymer with the remainder being water. The mixing of the two ingredients together can be done by simply blending the two ingredients together with agitation in a tank or other similar vessel. Since all of the components of this composition are water-soluble, a homogeneous composition should result.

In the typical use of the water-soluble paint detackification composition of my invention from 2.0–100,000 ppm is added to the paint spray booth waste water. Since the composition of the invention is expended during the normal treatment of water of this type, fresh material should be added to water which has been clarified by the composition of this invention. A preferred dosage range of the composition of this invention is from 10.0–50,000 ppm and most preferably from 15.0–20,000 ppm. The composition of this invention will generally be added to the water before it enters the paint spray booth circuit so that the additive will be present upon initial contact with overspray paint or lacquer. This material is generally let run down the walls of paint spray booths and over the grates and other surfaces which are desired to be kept free of paint accumulation.

In the use of the composition of this invention, the pH of the paint spray booth wash water should be alkaline. By this term it is meant pH's in the range of from about 7 to about 13. Since under normal conditions paint spray booth water will often be within this range without further adjustment, the composition of the invention may be used as it is. When the pH of the paint spray booth water falls below about 7, the addition of an alkali to the system may be called for. Suitable material for pH adjustment included alkali metal hydroxides such as those of potassium or sodium. If pH adjustment is necessary, it is generally preferred to add sodium hydroxide to the system due to its relatively low cost and efficiency. When adjusting the pH, for the maximum operating efficiency of this invention, the pH should be adjusted between 8–13 and preferably 8.5–12. These values generally are not high enough to cause severe corrosion problems yet work well in the course of this process.

The paints which this invention is applicable to include those conventionally used as automotive finishes and primers, metal enamels and paints, and others used in industrial process. Classes of these paints include enamels, paints, eletroplated finishes and epoxides among others.

In order to further illustrate this invention, the following examples are presented:

EXAMPLE I

To a reactor equipped with stirrer, thermometer, reflux condenser, and addition funnel was charged 21.21 parts water, 3.30 parts acrylamide, 4.73 parts diallyl dimethyl ammonium chloride, 0.01 part of a 50% aqueous solution of sodium hydroxide (to a pH between 6.8–7.0), 4.07 parts of N-vinyl-2-pyrrolidone and .01 part of 37% hydrochloric acid to adjust the pH to between 6.9–7.1. This mixture was agitated.

To a second reactor was then charged 33% or 11 parts by weight of the monomer solution made up in the first reactor. 5.62 parts by weight was then added with stirring, and the resultant solution was then purged with nitrogen for one-half hour. During this time, the reactor was heated to 140° F. At the end of one-half hour, a vacuum of 300 mm Hg was applied to the reactor and one-half of a solution prepared by mixing 1.99 parts by weight methyl alcohol with 0.09 part azobisisobutyronitrile was added to the reactor. An exothermic reaction resulted within approximately 2–5 minutes and the temperature was controlled at 145°–150° F by the application of vacuum for approximately one-half hour. At this point, the remainder of the catalyst solution was charged and the remaining two-thirds of the monomer solution from the first reactor was added at a constant rate over a period of 90 minutes. The reaction temperature was held at between 145°–150° F again using vacuum. The monomer solution was held at this temperature for an additional 3 hours at which time 58.97 parts water preheated to 140° F was added to the reactor. The resultant polymeric material contained approximately 12.1% polymer, was tinted slightly yellow, and was a moderately viscous polymer solution.

EXAMPLE II 1,791 pounds of the composition prepared in Example 1 was added to a blending tank. 3,583 pounds of a 50% solution of zinc chloride was then added with mixing followed by 71.5 gallons of water. The resultant solution was a homogeneous mixture of polymer and zinc chloride. This material is denoted as Example 2 and was saved for further use.

EXAMPLE III

The composition prepared in Example II was used to treat a white enamel paint obtained from a major automobile manufacturer. This test was run in a Waring blender with the paint and water at a pH of from 9–10. 0.2 ml. of the composition of Example II was added to the water followed by 0.05 ml. of the paint. The mixture was then agitated for 30 seconds and the paint consistency evaluated. The paint was well dispersed and was non-tacky. This would allow the rapid cleanup of this type of paint from an aqueous solution.

EXAMPLE IV

The composition of Example I was blended in the same manner as described in Example II using a 50% solution of magnesium chloride in place of zinc chloride. A sample of brown metallic paint from a major automobile manufacturer was obtained and tested in a spray booth having a pH of from 10–11. The flow in the spray booth was 1/2 cc per minute at a dosage ratio paint:chemical was 10:1. The paint was found to be dispersed and was rendered non-tacky. This would again allow rapid cleanup of the paint contained in the spray booth allowing for less downtime during cleanup. The water being removed from the spray booth would also be of such a quality as to be capable of being recycled, while the detackified paint particles could easily be removed from the paint spray booth wash by filtration, coagulation, centrifugation, etc.

I claim:

1. A composition for the clarification and detackification of alkaline paint spray booth wastes which comprises:
   A. 15–50% by weight of a water-soluble salt of an amphoteric metal;
   B. 1.0–15% by weight of a water-soluble cationic terpolymer containing prior to polymerization:
      1. 5–40% by weight of diallyl dimethyl ammonium chloride;
      2. 5–75% by weight N-vinyl-2-pyrrolidone;
      3. 10–60% acrylamide, said terpolymer having a molecular weight of from 5,000 to 300,000; and
   C. 35–85% water.

2. The composition of claim 1 wherein the water-soluble salt of an amphoteric metal is from the group consisting of magnesium chloride, zinc chloride, zinc sulfate, aluminum chloride, aluminum sulfate, ferric chloride, and ferric sulfate.

3. The composition of claim 1 wherein the water-soluble salt of an amphoteric metal is magnesium chloride.

4. A process for the clarification and detackification of alkaline paint spray booth wastes which comprises:
   A. Adding to the paint spray booth wastes from 2.0–100,000 ppm of a composition consisting essentially of:
      1. 15–50% by weight of a water-soluble salt of an amphoteric metal, said metallic salt being able to form an insoluble hydroxide at pH values greater than about 7;
      2. 1.0–15% by weight of a water-soluble cationic terpolymer containing prior to polymerization:
         a. 5–40% by weight of diallyl dimethyl ammonium chloride;
         b. 5–75% by weight N-vinyl-2-pyrrolidone;
         c. 10–60% acrylamide, said terpolymer having a molecular weight of from 5,000 to 300,000;
      3. 35–85% water;
   B. Mixing the composition of Step A with the paint spray booth waste;
   C. Allowing the composition to interact with the waste whereby the paint particles contained therein are coated by the hydroxide of the metallic salt and detackified;
   D. Recovering a metallic hydroxide coated detackification paint particles whereby the aqueous paint spray booth waste is clarified.

5. The process of claim 1 wherein water-soluble salt of an amphoteric metal is from the group consisting of magnesium chloride, zinc chloride, zinc sulfate, aluminum chloride, aluminum sulfate, ferric chloride, and ferric sulfate.

6. The process of claim 4 wherein the water-soluble salt of an amphoteric metal is magnesium chloride.

* * * * *